United States Patent
Adams et al.

(10) Patent No.: US 7,509,738 B2
(45) Date of Patent: Mar. 31, 2009

(54) SOLID-FREE-FORM FABRICATION OF HOT GAS VALVE DISCS

(75) Inventors: Robbie J. Adams, Phoenix, AZ (US); Don L. Mittendorf, Mesa, AZ (US); Scott M. Sperl, Carefree, AZ (US)

(73) Assignee: Honeywell International, Inc., Morristown, NJ (US)

( * ) Notice: Subject to any disclaimer, the term of this patent is extended or adjusted under 35 U.S.C. 154(b) by 505 days.

(21) Appl. No.: 11/192,873

(22) Filed: Jul. 28, 2005

(65) Prior Publication Data
US 2006/0163521 A1 Jul. 27, 2006

Related U.S. Application Data

(60) Provisional application No. 60/647,695, filed on Jan. 26, 2005.

(51) Int. Cl.
B05D 3/00 (2006.01)
B21B 1/46 (2006.01)
B21D 53/00 (2006.01)
F16K 1/42 (2006.01)
H05H 1/24 (2006.01)

(52) U.S. Cl. ............ 29/890.01; 29/890.129; 29/890.12; 29/527.2; 29/526.2; 29/525.14; 427/569; 427/532; 251/359

(58) Field of Classification Search .......... 29/525.14, 29/526.2, 526.4, 527.2, 890.1, 890.12, 890.129; 427/532, 569; 251/359
See application file for complete search history.

(56) References Cited

U.S. PATENT DOCUMENTS

| | | | |
|---|---|---|---|
| 3,952,180 A * | 4/1976 | Gnanamuthu | 219/121.65 |
| 4,732,818 A | 3/1988 | Pratt et al. | |
| 4,759,804 A * | 7/1988 | Sigler | 148/542 |
| 4,817,858 A | 4/1989 | Verpoort | |
| 5,182,170 A * | 1/1993 | Marcus et al. | 264/497 |
| 5,653,925 A | 8/1997 | Batchelder | |
| 5,665,659 A * | 9/1997 | Lee et al. | 438/646 |
| 5,745,834 A * | 4/1998 | Bampton et al. | 419/37 |
| 5,786,023 A | 7/1998 | Maxwell et al. | |
| 6,228,437 B1 | 5/2001 | Schmidt | |
| 6,284,176 B1 | 9/2001 | Oujiri | |
| 6,530,958 B1 | 3/2003 | Cima et al. | |
| 6,680,456 B2 | 1/2004 | Adams | |
| 6,710,296 B2 * | 3/2004 | Siedal | 219/121.85 |
| 6,770,560 B2 * | 8/2004 | Abe | 438/637 |

(Continued)

*Primary Examiner*—David P Bryant
*Assistant Examiner*—Alexander P Taousakis
(74) *Attorney, Agent, or Firm*—Ingrassia Fisher & Lorenz, P.C.

(57) ABSTRACT

A hot gas valve disc for a divert and attitude control disc switching element used in a propelled craft. The hot gas valve disc comprises a first layer comprising a first metal material having a first grain size and a first grain orientation, and at least one additional layer comprising a second metal material having a second grain size that differs from the first grain size, or a second grain orientation that differs from the first grain orientation. A method of manufacturing the hot gas valve disc comprises the steps of fabricating a first metal layer using a solid-free-form fabrication process, the first metal layer having a set of grain characteristics comprising grain size and grain structure, followed by heating the first layer and thereby changing at least one of the grain characteristics.

9 Claims, 4 Drawing Sheets

U.S. PATENT DOCUMENTS

| | | |
|---|---|---|
| 6,800,148 B2 | 10/2004 | Frasier et al. |
| 6,814,926 B2 | 11/2004 | Geving et al. |
| 6,821,462 B2 | 11/2004 | Schulman et al. |
| 6,932,865 B2 * | 8/2005 | Brice .......................... 117/40 |
| 2003/0029212 A1 * | 2/2003 | Im ................................ 72/54 |
| 2003/0059640 A1 * | 3/2003 | Marton et al. ............... 428/544 |
| 2004/0025939 A1 | 2/2004 | Woessner |
| 2004/0041058 A1 | 3/2004 | Woessner et al. |
| 2005/0112015 A1 * | 5/2005 | Bampton ....................... 419/5 |

* cited by examiner

SOLID-FREE-FORM FABRICATION OF HOT GAS VALVE DISCS

CROSS-REFERENCES TO RELATED APPLICATIONS

This application claims the benefit of U.S. Provisional Application No. 60/647,695 filed Jan. 26, 2005.

TECHNICAL FIELD

The present invention relates to pneumatic valves, and more particularly to lightweight pneumatic valves capable of withstanding the hot gas environment generated from burning propellants used in various systems such as divert and attitude control systems for missiles, interceptors, and space craft.

BACKGROUND

Space craft, missiles, and other projectiles are sometimes equipped with steering features that enable the projectiles to provide for their own guidance. Some of such features include various propellant output valves that operate by opening and closing to redirect propellant thrust and thereby steer the projectile.

Valves for propellant redirection are typically lightweight, yet capable of withstanding the hot environment produced by engine gases since engine gas generators may use and exhaust gases at between 2000 and 5000° F. Even if valves are only required to be briefly exposed to hot gases, the valves should be capable of withstanding such high temperatures for their short duty cycles. For this reason, high temperature divert and attitude control valves for space craft, missiles, interceptors, and other craft are sometimes formed from refractory metals that maintain their strength and form at high temperatures. Also, valves and valve components that are not subjected to hot environments are commonly made from refractory metals or other metals that have high strength and are metallurgically sound.

Although care is taken to produce hot gas valves and other valves that are structurally and metallurgically sound, the processes for manufacturing the valves can be somewhat inefficient. Refractory metal hot gas valve components are currently produced by performing electro-discharge machining and grinding processes on large refractory metal plates or bars. The plates and bars themselves are typically fabricated using sintered powder metallurgy processes. Although the valves that are formed from these combined processes are operable at high temperatures, the valve components may include micropores or other inconsistencies that are sometimes products of sintered powder metallurgy processes, and that may affect valve's mechanical integrity if the components are included in the valve. The component inconsistencies require screening prior to manufacturing and/or using a hot gas valve to assure that the valve will operate correctly at high temperatures.

One example of a valve component that is formed from a refractory metal using sintered powder metallurgy processes is a disc that is a component of some hot gas valves that are used in missiles. The disc allows propellant gas to flow out of only one side of the valve or the other. However, if the discs have micropores or other inconsistencies that are sometimes associated with sintered powder metallurgy processes, they can potentially deform or crack at temperatures ranging from room temperature to the elevated operating temperatures.

Since hot gas valves that include discs for gas flow regulation provide some distinct advantages over other valve designs, many efforts have been undertaken to find ways to manufacture refractory metal discs having consistent structural and metallurgical characteristics. One recent manufacturing development includes fabricating a refractory metal-based plate, such as a rhenium-based plate, using layer additive manufacturing (LAM), which is one of many solid-free-form fabrication processes that are increasingly being used to manufacture parts in three-dimensional space by depositing successive layers of material. However, the LAM-formed discs are typically either sufficiently ductile but have low strength, or are sufficiently strong but have low ductility, depending on the refractory metal alloy composition.

Hence, there is a need for methods for manufacturing hot gas valve discs and other valve components that have high ductility and high strength. There is a particular need for methods that manufacture such components with high structural and metallurgical consistency so that the need for inefficient screening methods can be minimized.

BRIEF SUMMARY

The present invention provide a method of manufacturing a hot gas valve disc for a divert and attitude control disc switching element used in a propelled craft. The method comprises the steps of fabricating a first metal layer using a solid-free-form fabrication process, the first metal layer having a set of grain characteristics comprising grain size and grain structure, followed by heating the first layer and thereby changing at least one of the grain characteristics.

The present invention also provides a hot gas valve disc for a divert and attitude control disc switching element used in a propelled craft. The hot gas valve disc comprises a first layer comprising a first metal material having a first grain size and a first grain orientation, and at least one additional layer comprising a second metal material having a second grain size that differs from the first grain size, or a second grain orientation that differs from the first grain orientation.

Other independent features and advantages of the preferred apparatus and method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

The following description includes several methods for manufacturing hot gas valve discs and other valve components that have high ductility and high strength. Although the discussion is directed specifically toward such components, the manufacturing methods are not limited to hot gas valves, and can be used to manufacture a variety of other metal-containing components that are used in various industries. The manufacturing methods include solid-free-form fabrication processes, alone or in combination with heating steps, to modify the metal grain size and orientation as needed to produce metal-containing components having high structural and metallurgical consistency.

Figure 1:
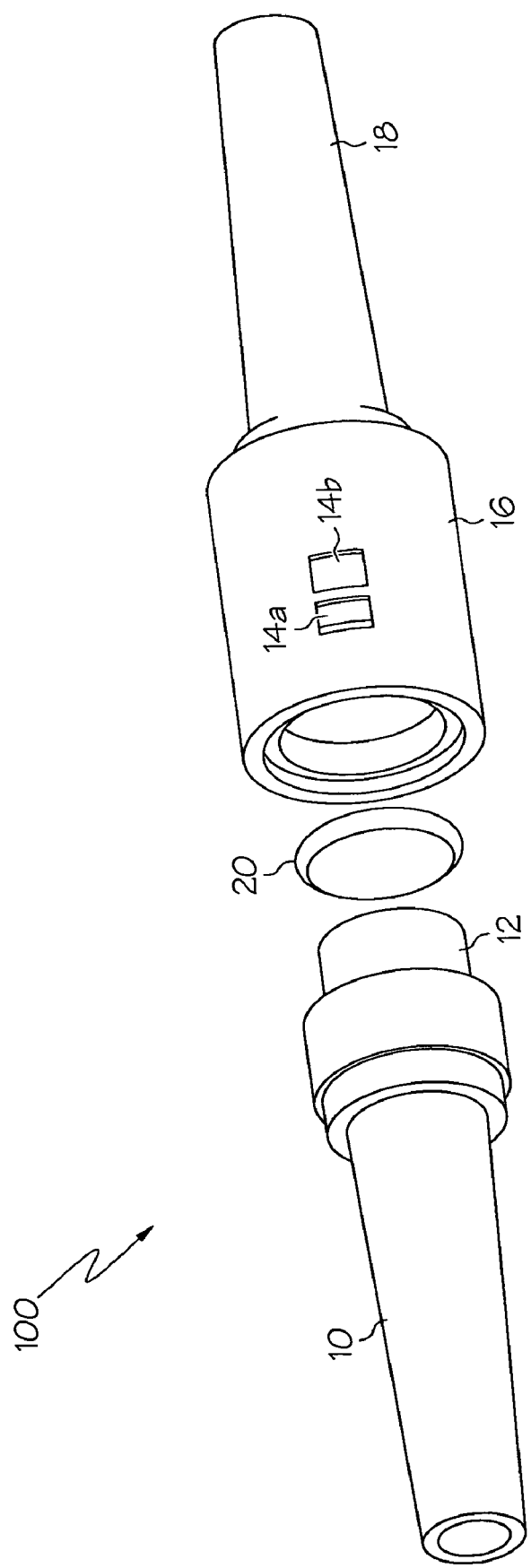
FIG. 1 is an exploded perspective view of a disc switching element and its components, including a thruster, a hot gas valve disc, a disc seat, and a disc chamber.

FIG. 1 is an exploded perspective view of a high temperature divert and attitude control disc switching element 100 and its components for propelled craft. The disc switching element 100 includes first and second side thrusters 10, 18, and a disc chamber 16. The first side thruster 10 includes a first disc seat 12 that is housed inside the disc chamber 16, and the second side thruster 18 also includes a non-illustrated second disc seat. A hot gas valve disc 20 is also housed inside the disc chamber 16 between the side thrusters 10, 18. The disc chamber 16 includes first and second gas inlet ports 14a, 14b and the hot bas valve disc 20 is positioned between the first and second gas inlet ports 14a, 14b. The side thrusters control a propelled craft's roll, pitch, and yaw movements, and can be powered by the same engine propellant as the main rearward-thrust engine. When propellant gas enters one of the gas inlet ports 14b, the hot gas valve disc 20 is pneumatically pushed toward one of the disc seats and the propellant gas exits the side thruster that is on the same side as the gas inlet port by which the propellant gas entered the disc chamber 16. For example, if the propellant gas enters the disc chamber 16 by way of the second gas inlet port 14b, the disc 20 is pneumatically pushed away from the second gas inlet port 14b and toward the disc seat 12 to thereby effectively cause the propellant gas from exiting only through the second side thruster 18.

Figure 2:
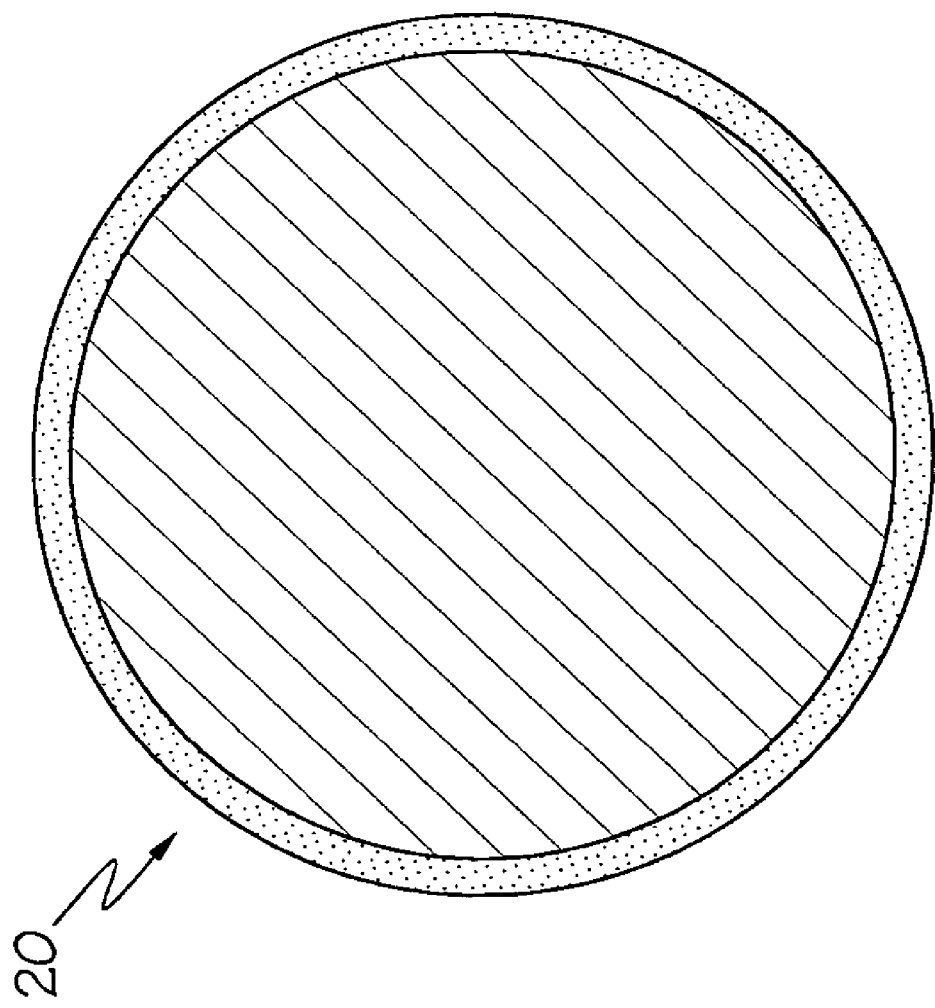
FIG. 2 is a top view of a first exemplary hot gas valve disc manufactured according to an embodiment of the present invention.

Turning now to FIG. 2, a top view of an exemplary disc 20 is illustrated. The disc 20 is a thin circular member having flat top and bottom surfaces with tapered edges that facilitate placement of the disc 20 into a disc seat 12. However, the disc 20 may be modified in terms of size and shape. As some non-limiting examples, an Attitude Control Assembly disc is approximately 0.375 inch in diameter and approximately 0.050 inch in thickness; a Main Thrust Assembly disc is approximately 0.750 inch in diameter and approximately 0.090 inch in thickness. The disc edges may be tapered, beveled, flat, or otherwise shaped as needed. Again, many other disc shapes and sizes may be manufactured using the manufacturing methods of the present invention.

Figure 3:
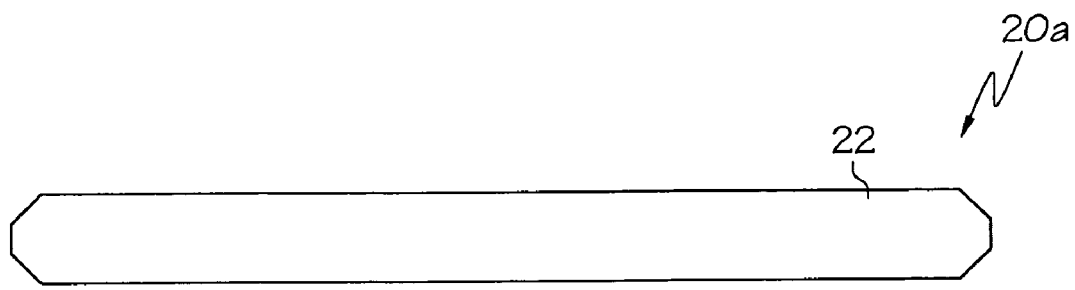
FIG. 3 is a side view of the first exemplary hot gas valve disc illustrated in FIG. 2.

According to the illustrated embodiment in FIG. 3, a disc 20a is formed as a single layer 22. Many refractory metals and alloys are high strength, making them suitable disc materials. Pure rhenium and rhenium alloys are exemplary refractory metals in the single-layer embodiment and the subsequently described multi-layer composites. Some exemplary rhenium alloys include one or more of tungsten, tantalum, molybdenum, or other high temperature elements. Other suitable metals and alloys may be tungsten or tungsten-based alloys, tantalum or tantalum-based alloys, or other high temperature metals and alloys of the same.

Figure 6:
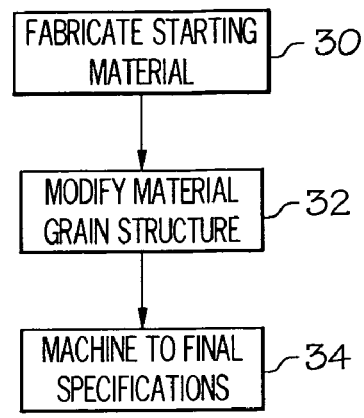
FIG. 6 is a flow chart that outlines a method for manufacturing a single-layer disc such as that illustrated in FIG. 3.

FIG. 6 is a flow chart that outlines a method for manufacturing a single-layer disc such as the disc 20a illustrated in FIG. 3. Step 30 comprises fabricating a starting material using a solid-free-form fabrication (SFFF) process. SFFF is a designation for a group of processes that produce three dimensional shapes from additive formation steps. SFFF does not implement any part-specific tooling. The three dimensional part is produced from a 3D representation devised in Computer Aided Modeling (CAD). This computer representation is a layer-by-layer slicing of the shape into consecutive two dimensional layers, which can then be fed to control equipment to fabricate the part.

A few SFFF processes are described next, by way of example. A basic description of an exemplary ion fusion formation (IFF) process is disclosed in U.S. Pat. No. 6,680,456 which is hereby incorporated by reference. In a broad sense, a hot gas valve disc starting material is built using IFF by applying small amounts of molten material just to positions where necessary to build the starting material. The starting material is formed through many small deposition steps resulting in a net-shape or near-net-shape starting material. Applying this concept to an embodiment of the present invention, the IFF process includes a series of small deposition steps to produce a starting material that is nearly or completely shaped as a hot gas valve disc. An IFF system includes a plasma torch that is positioned to emit a plasma stream in a path that is directed toward a deposition point where component formation occurs. The plasma stream creates a melt pool at the deposition point. A feedstock feeder is operably configured to feed feedstock into the plasma torch path. Upon being introduced into the plasma torch path, the feedstock melts at the deposition point. A part is fabricated by transferring the feedstock from the feedstock feeder to the deposition point in a controlled manner, melting the feedstock at the deposition point, and allowing it to re-solidify on the work surface or on previously-deposited feedstock material.

There are also several exemplary LAM processes that can be used to fabricate starting material. One such LAM process, disclosed in U.S. Pat. No. 6,680,456, incorporated herein by reference, is a selective laser sintering process that involves selectively depositing a material such as a laser-melted powdered material onto a substrate to form complex, net-shape objects. In operation, a powdered material feeder provides a uniform and continuous flow of a measured amount of powdered material to a delivery system. The delivery system directs the powdered material toward a deposition stage in a converging conical pattern, the apex of which intersects the focal plane produced by a laser in close proximity to the deposition stage. Consequently, a substantial portion of the powdered material melts and is deposited on the deposition stage surface. By causing the deposition stage to move relative to the melt zone, layers of molten powdered material are deposited. Initially, a layer is deposited directly on the deposition stage. Thereafter, subsequent layers are deposited on previous layers until the desired three-dimensional object is formed as a net-shape or near net-shape object.

In addition to process described above, there are numerous other SFFF techniques that can be used to manufacture the starting materials. Some suitable SFFF techniques include selective laser sintering processes in which a laser is used to selectively melt layers of powder materials into a shape. Other suitable SFFF techniques include stereolithography processes in which a UV laser is used to selectively cure a liquid plastic resin. SFFF entails many different approaches to the method of fabrication. Layer additive manufacturing (LAM), fused deposition modelling (FDM), and IFF are a few other examples that are suitable for fabricating a disc starting material.

Step 32 comprises modifying the grain structure for the previously formed starting material. Grain modification can be carried out using several approaches. For example, deposits of pure rhenium and rhenium alloys are sometimes large-grained. From a large-grain starting point, the starting material is modified by heating the starting material, or by deforming and then heating the starting material, to obtain improved properties. In one embodiment, the starting material is heated above the material's recrystallization temperature, enabling the grains to grow even larger. Further, the starting material can be heated until the grains grow large enough that they are joined so that there are fewer overall grains than before heating was applied. In fact, the starting material may be heated until the grains are joined as a substantially single grain, meaning that the crystal structure is substantially continuous in the modified starting material. The grain or grains that are formed from the heating and/or deformation steps are formed to have a desired orientation to provide optimal strength and ductility. In another embodiment, the starting material is heated and then deformed, and then recrystallized to have smaller but application-specific grain orientations and sizes.

Step 34 comprises machining the grain-modified object to final specifications. As mentioned previously, the SFFF process that is used to prepare the starting material produces an object in its net-shape or near net-shape. Consequently, the grain-modified may not need machining or other processing after its grain structure is optimized. If some final reshaping is necessary, numerous machining processes can be carried out.

Figure 4:
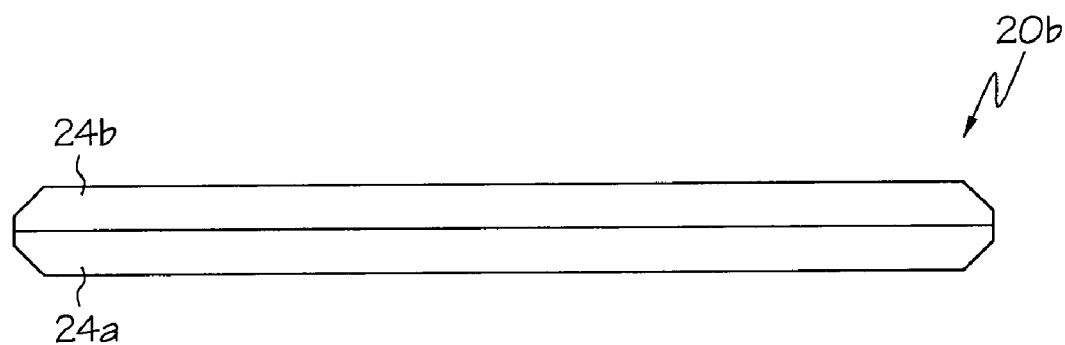
FIG. 4 is a side view of a second exemplary hot gas valve disc.
Figure 5:
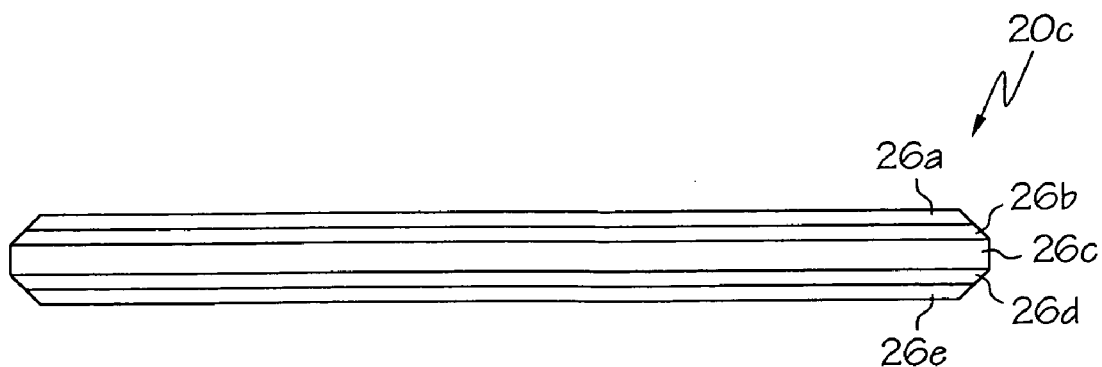
FIG. 5 is a side view of a third exemplary hot gas valve disc.

Turning now to FIGS. 4 and 5, exemplary embodiments of multi-layered discs 20b, 20c are illustrated. The illustrated discs 20b, 20c are thin circular members having flat top and bottom surfaces with tapered edges that facilitate placement of the disc 20 into a disc seat 12. However, as with the previously-described embodiment, the discs 20b, 20c may be modified in terms of size and shape. For example, the disc edges may be tapered, beveled, flat, or otherwise shaped as needed.

According to the illustrated embodiment in FIG. 4, the disc 20b is formed with two layers 24a, 24b. The disc 20c illustrated in FIG. 5 is formed from five layers 26a-26e. As with the previously-described embodiment, the exemplary discs 20b, 20c are preferably made using refractory metals and alloys such as substantially pure rhenium and rhenium alloys.

Figure 7:
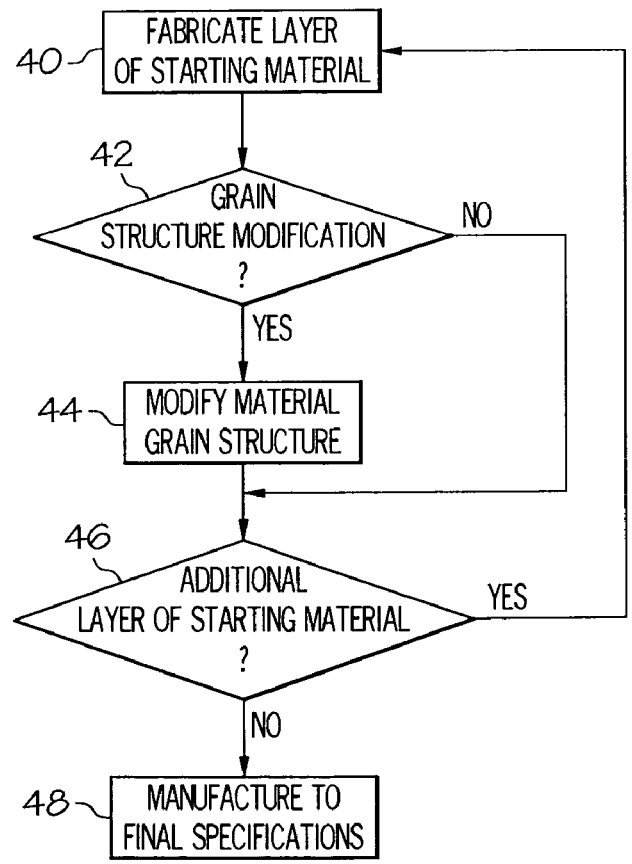
FIG. 7 is a flow chart that outlines a method for manufacturing a multiple-layer disc such as those illustrated in FIGS. 4 and 5.

FIG. 7 is a flow chart that outlines a method for manufacturing a multi-layer disc such as discs 20b, 20c illustrated in FIGS. 4 and 5. Step 40 comprises fabricating a layer of starting material. In the embodiments illustrated in FIGS. 4 and 5, each of the layers 24a-24b, and 26a-26e is formed in the same manner as single layer 22 from FIG. 3 and as described in association with FIG. 6.

After fabricating a layer, step 42 comprises determining whether the grain structure should be modified. For some layers, the grain structure may be satisfactory after being fabricated using a solid free form fabrication method, and further grain modification may not be desirable. However, if it is desirable to optimize the grain structure, then the method continues to step 44, which comprises modifying the starting material layer in the same manner described in step 32 with reference to FIG. 6.

After modifying the starting material layer's grain structure, or after determining that no such modification is desirable, step 46 comprises determining whether additional layers of starting material should be manufactured. There are several advantages provided by a multi-layer component such as a hot gas valve disc. For example, a composite of grain orientations, grain sizes, and/or compositions can be produced by bonding multiple layers together. In one exemplary embodiment, multiple layers having large grains but with different grain orientations are combined to form a hot gas valve disc that has improved resistance to cracking or excessive deformation. For example, for the disc 20b in FIG. 4, the layers 24a, 24b may be formed from the same or different materials, with one layer 24a having grains of a first grain size and orientation, and the other layer 24b having a grains of approximately the same size, but a different orientation. In another embodiment, similar advantages are provided by producing a multiple-layer hot gas valve disc, with different grain sizes in different layers. For example, in the disc 20c in FIG. 5, the layers 20a-20e may be formed from the materials having different grain sizes and/or orientations. The outermost layers 26a, 26e may be similar in their grain size and structure since both are exposed to similar environmental conditions. Inner layers 26b-26d may have grain sizes that differ from those of the outer layers 26a, 26e, and are the same or different with respect to one another. In yet another embodiment, at least one layer of the hot gas valve disc is formed from a metal or alloy that differs from that of at least one other layer.

If it is determined that one or more layers of starting material should be manufactured, then the method returns to step 40 for fabrication of a starting material layer. If no additional layers are needed or desirable, then the method proceeds to stop 48, which comprises manufacturing the component to final specifications. Manufacturing the component may include bonding the individual layers together. In one embodiment, the layers are diffusion bonded together by application of at least heat and/or compression. In another embodiment, a thin activator metal layer, such as a thin ruthenium layer, is disposed between the layers to aid in diffusion bonding. Other activator metals may include nickel, chromium, cobalt, niobium, tantalum, and hafnium. Additional machining may be necessary to form the discs 20b, 20c in their final forms as explained previously in step 34 with reference to FIG. 6.

The preceding description thus includes several methods for manufacturing hot gas valve discs and other valve components that have high ductility and high strength. The solid-free-form fabrication processes, alone or in combination with heating steps, modify the metal grain size and orientation as needed to produce metal-containing components having high structural and metallurgical consistency.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of manufacturing a hot gas valve disc for a divert and attitude control disc switching element used in a propelled craft, the method comprising the steps of:

fabricating a first metal layer using a solid-free-form fabrication process, the first metal layer having a set of grain characteristics comprising grain size and grain structure;

heating the first metal layer and thereby changing at least one of the grain characteristics;

fabricating at least one additional metal layer using a solid-free-form fabrication process, the at least one additional layer having a set of grain characteristics comprising grain size and grain structure that differ from the first metal layer grain characteristics; and diffusion bonding the at least one additional metal layer to the first metal.

2. The method according to claim 1, wherein the at least one additional metal layer is fabricated from the same metal as the first metal layer.

3. The method according to claim 2, wherein the at least one additional metal layer is fabricated with a different grain orientation than the first metal layer.

4. The method according to claim 1, wherein the diffusion bonding step further comprises depositing an activator metal layer between the first metal layer and the at least one additional layer to aid in diffusion bonding.

5. The method according to claim 1, wherein the heating step enlarges the first metal grain size.

6. The method according to claim 1, wherein the heating step causes the grains to join into a substantially single grain.

7. The method according to claim 1, wherein performing the solid-free-form fabrication process produces the hot gas valve disc in net or near-net shape.

8. The method according to claim 1, wherein performing the solid-free-form fabrication process produces the first and at least one additional metal layers in net or near-net shape.

9. The method according to claim 1, wherein one or more of the additional metal layers is fabricated from a different metal than the first metal layer.

* * * * *